US007492733B2

(12) United States Patent
Hagirahim et al.

(10) Patent No.: US 7,492,733 B2
(45) Date of Patent: Feb. 17, 2009

(54) METHOD OF TRANSMITTING PACKETS IN A MOBILE 3G NETWORK SYSTEM

(75) Inventors: Hassan Hagirahim, Long Branch, NJ (US); Francis Waldman, Fair Haven, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1129 days.

(21) Appl. No.: 09/841,541

(22) Filed: Apr. 24, 2001

(65) Prior Publication Data

US 2002/0154642 A1    Oct. 24, 2002

(51) Int. Cl.
*H04L 12/56* (2006.01)
(52) U.S. Cl. .................. 370/328; 370/338; 370/401
(58) Field of Classification Search ............... 370/389, 370/352, 356, 401, 328, 338, 392, 400; 455/422.1, 455/432.1, 433, 432
See application file for complete search history.

(56) References Cited

U.S. PATENT DOCUMENTS

| | | | |
|---|---|---|---|
| 6,195,705 B1 * | 2/2001 | Leung | 709/245 |
| 6,407,988 B1 * | 6/2002 | Agraharam et al. | 370/328 |
| 6,798,763 B1 * | 9/2004 | Kimura et al. | 370/338 |
| 6,816,912 B1 * | 11/2004 | Borella et al. | 709/238 |
| 6,963,918 B1 * | 11/2005 | Leung | 709/238 |
| 2001/0053694 A1 * | 12/2001 | Igarashi et al. | 455/433 |
| 2002/0078238 A1 * | 6/2002 | Troxel et al. | 709/245 |
| 2002/0142770 A1 * | 10/2002 | Goldberg et al. | 455/433 |
| 2004/0024901 A1 * | 2/2004 | Agrawal et al. | 709/238 |

\* cited by examiner

*Primary Examiner*—Wing F Chan
*Assistant Examiner*—Duc T Duong

(57) ABSTRACT

A system and method is provided for transmitting a packet received at a Foreign Agent associated with a Packet Data Service Node where the packet has a source network layer address, such as an Internet Protocol address of a mobile station that points to a geographically remote Home Agent and a destination Internet Protocol address. The method comprises caching Internet Protocol addresses in memory, comparing the destination Internet Protocol address of the received packet with the Internet Protocol addresses in memory, and if no match is found, querying a Policy Server for a match, and forwarding the received packet with the Internet Protocol address of the Foreign Agent associated with the Packet Data Service Node as the source Internet Protocol address when the destination address of the received packet matches the Internet Protocol address in memory or Policy Server, resulting in significant savings in transport cost and response time.

19 Claims, 3 Drawing Sheets

METHOD OF TRANSMITTING PACKETS IN A MOBILE 3G NETWORK SYSTEM

BACKGROUND OF THE INVENTION

1. Field of the Invention

The present invention relates generally to the mobile internet and, more particularly, to a method of transmitting information to a mobile telephone via the packet data network.

2. Description of the Prior Art

A situation often experienced by a mobile telephone subscriber, whether in a vehicle or on foot, in a remote and unfamiliar geographical area, is the need to obtain assistance, information and/or aid promptly. For example, in the case of a breakdown or disabling of a vehicle where roadside assistance is required, the person in need must select a most convenient and suitable provider of the required service. Under normal circumstances, this is at best difficult and highly time consuming. Even when the vehicle is provided with wireless communication, for example, a mobile telephone, the problem still exists in locating a service provider, and, in those instances where time is important, locating and obtaining the telephone number of the nearest service provider.

A similar situation occurs when a traveler, using a mobile telephone in a remote geographical area needs to reach a specific type of service provider in that area such as a hotel or a restaurant. Wireless telecommunication systems currently support the use of mobile terminals that are capable of both voice and data communication. These devices typically include an integrated wireless telephone and a software controlled data terminal that implements a micro browser for web surfing and other data communication activities. These features have been used to advantage by commercial entities, which have employed data network (e.g., Internet) servers to provide customer service information via web page documents sent to micro browser equipped wireless terminals. With their integrated telephony equipment, mobile stations can request and receive such information while a subscriber is at any location served by the wireless network. The advantages of location-dependent personalization of customer service information are several. For example, a mobile station subscriber located in a remote geographical area can obtain and call the telephone number of a specific service such as a hotel, a restaurant etc.

The third generation of the CDMA technology defines packet data networking described in the Mobile IP standards (RFC 2002, IS 835). The standard allows a mobile data source to maintain its own IP address while accessing the network (Internet, Corporate Intranet) from any location that supports Mobile IP. The main components of the Mobile IP network are the PDSN/FA (Packet Data Service Node/Foreign Agent) and the Home Agent (HA). The Home Agent is responsible for user authentication/service authorization as well as "tunneling" responses back to the Mobile Station (MS) from servers that were accessed by the MS.

Currently, there are certain situations where the network resources, when using a mobile telephone or a computing device for data communications, are not utilized in the most efficient way. For example, a mobile user with the home location in New York while visiting La Jolla, Calif. makes a call which establishes a connection from the wireless network in La Jolla, Calif., to a PDSN/FA in San Diego. The MS has an IP address that points to the Home Network in New York. To authenticate the user, the Foreign Agent (FA) connects to the HA in New York. After authentication/authorization, the user will ask for services by sending IP packets to the PDSN. The user may request seafood restaurant recommendations that are within two miles of his/her current position. The PDSN forwards the user's IP packets to the service provider server that, in this example, is Los Angeles. The network determines the user's current location and provides him/her with a list of restaurants. The server sends the packets to the source address obtained from the user's packets. This address points to the home network in New York and the packets will be forwarded to the HA in NY. The Home Agent determines that the packets are intended to the MS, and sends them in a "tunnel" (previously established between the PDSN/FA and the HA) to the PDSN/FA. The PDSN/FA terminates the tunnel and sends the packets to the MS over the radio network. Thus, these packets, instead of being sent from LA directly to San Diego, and then to the MS in La Jolla, they are actually sent from LA to New York and back to San Diego to be forwarded to La Jolla. Clearly, in the above noted example, if the transmission of the list of restaurants between New York and San Diego can be eliminated, the use of the network resources would be decreased and the round trip delay would be reduced. This invention is directed towards solving this problem.

SUMMARY OF THE INVENTION

The foregoing problem is solved and an advance is made over the prior art in accordance with the principles of the invention wherein, while still adhering to the IS 835, RFC 2002 standards, each user from a foreign agent is authenticated via the home agent and service authorization is obtained from the home agent. As described in the standards, all packets not designated to be treated in accordance with the principles of this invention, are routed to their destinations and responses are sent to the home agent first and then tunneled to the PDSN/FA. But, packets that are designated to be processed according to this invention are routed differently than those that are routed according to the standards (default or standard mode). In this invention, the Packet Data Service Node automatically assumes a proxy role and receives the response directly without intervention of the Home Agent. More specifically, with reference to the above noted example, when a request is made to identify a restaurant, every connection to the Universal Resource Locator (URL) for identifying restaurants such as the URL www.restuarants.com is processed according to this invention; that being where the Packet Data Service Node (PDSN) assumes the role of the proxy for this address. All packets received from the Mobile Station designated to www.restaurants.com will be sent by the PDSN with its own IP address as the source address. Thus, the server in LA will send the response packets to the PDSN, which will then forward them to the MS without going to N.Y. With this invention, the response packets do not travel all the way to N.Y. and then return to San Diego. This results in savings in transport cost as well as a reduction of response time. Other WEB requests designated as proxy mode are treated in the standard way where the response packets do travel to N.Y. and are tunneled back to San Diego.

BRIEF DESCRIPTION OF THE DRAWING

The features, aspects and advantages of the present invention will become better understood with regard to the following description, appended claims, and accompanying drawings where:

DETAILED DESCRIPTION OF THE PREFERRED EMBODIMENT

Figure 1:
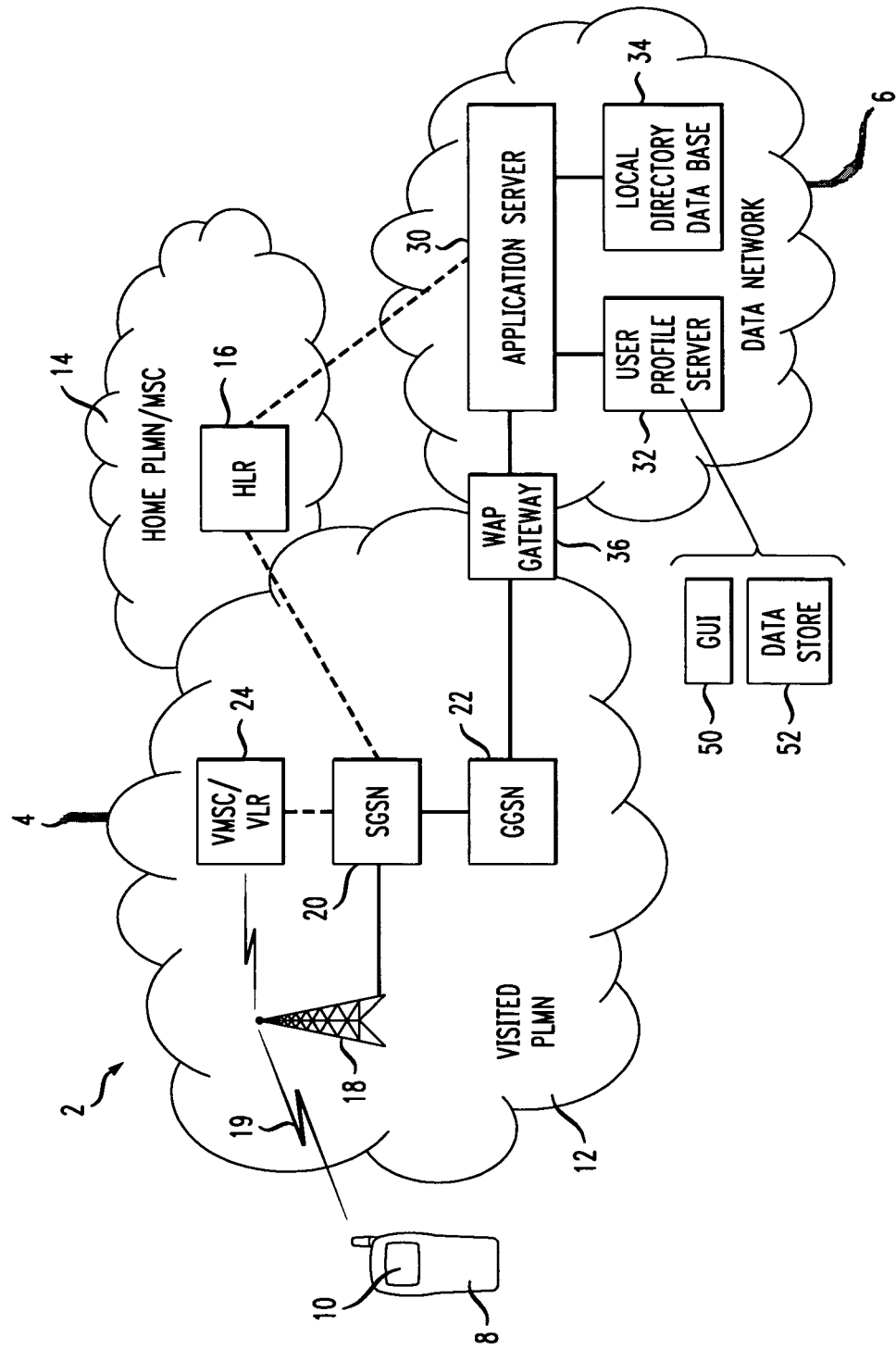
FIG. 1 is a functional diagram showing a network architecture for a wireless telecommunication system that provides location based directory numbers and names for types of services selected by the mobile station user.

Turning now to the figures, wherein like reference numerals represent like elements in all of the several views, FIG. 1 illustrates a network architecture for a telecommunication system 2 that provides customer service. As shown, the telecommunication system 2 includes a wireless network resource group 4 and a data network resource group 6. The wireless network resource group 4 can be implemented in a conventional wireless telephone network that has been enhanced to carry data. A wireless network capable of carrying circuit-switched data can be used for this purpose. More preferably, however, the wireless network resource group 4 provides packet-switched data service. An example of a wireless infrastructure include UMTS (Universal Mobile Telephone System), a "$3^{rd}$ Generation" wireless system based on GSM (Global System for Mobile communications). GSM adds a packet network overlay known as GRPS (GSM Packet Radio Service) to a wireless circuit voice network. It is thus ideally suited for implementing the wireless network resource group 4 of FIG. 1. The data network resource group 6 of FIG. 1 can be implemented using a conventional packet data network based on the IP (Internet Protocol) and/or ATM (Asynchronous Transfer Mode) protocols, and which also has wireless network access capability.

In the architecture of FIG. 1, a mobile station 8 is assumed to include an integrated wireless transceiver for voice and data delivery, and a software-controlled data terminal that includes a display 10. The mobile station 8 should be capable of displaying text messages, and may also implement a graphical user interface, such as a web browser or the like. By way of example only, the mobile station 8 can implement a WAP (Wireless Application Protocol) micro-browser to display WML (WAP Markup Language) documents. There are a variety of suitable wireless terminal products on the market today, and others in development. These include web enabled telephones, PDAs (Personal Digital Assistants), handheld computers, pagers and the like.

In FIG. 1, the mobile station 8 is further assumed to be roaming in a network that is not owned by the provider from which services are subscribed. As such, the wireless network resource group 4 is shown as including a visited PLMN (Public Land-based Mobile Network) 12 and a home PLMN 14. The home PLMN 14 is the network owned or operated by the provider from which services are subscribed, and the visited PLMN 12 serves the wireless terminal when it is roaming. The home PLMN 14 includes a home location register (HLR) 16. The home location register 16 implements a conventional HLR (Home Location Register) function that maintains generalized location information about wireless terminals under its jurisdiction (i.e., the network and vicinity of a mobile, such as the mobile's current location/routing area). The home location register 16 can also track intra-network (i.e., cell-to-cell) mobile terminal movement by initiating queries of base station resources in a mobile terminal's current PLMN, as described in more detail below. The home location register (HLR) 16 further includes an inter-working function for communicating wireless terminal location information to a data network (IP) resource group 6, and maintains an interface with an application server 30 (see below) in the data network resource group. Via this interface, the home location register 16 sets a location update notification flag at the request of the application server 30 and notifies the application server whenever there is a mobile terminal location change. The location change may be a change from one visited PLMN to another, or a change from one cell to another within the same PLMN.

The visited PLMN 12 includes a Base Station 18, a data switching node 20, a data network gateway (GGSN) 22, and a visitor location register (MSC/VLR) 24. The base station 18 communicates over an air interface 19 with the mobile station 8. The data switching node 20 is labeled "SGSN" (Serving GPRS Support Node) in FIG. 1 according to the UMTS designation for this component. Other wireless network standards may use other names. For example, the ANSI-41 standard for CDMA (Code Division Multiple Access) data networks use the terms "PCF" (Packet Control Function). Regardless of the implementation specific name applied, the data switching node 20 is a conventional router entity with mobility support capability that routes data traffic between the base station 18 and the data network resource group (IP) 6. The data switching node 20 also performs a conventional VLR (Visitor Location Register) function in terms of mobile location. It therefore reports to the HLR 16 whenever the mobile station 8 is operating within the jurisdiction of the visited PLMN 12.

The data network gateway 22 is labeled "GGSN" (Gateway GPRS Support Node) in FIG. 1, according to the UMTS designation for this component. Other wireless network standards may use other names. For example, the ANSI-41 standard for CDMA (Code Division Multiple Access) data networks use the term "PDSN" (Packet Data Serving Node). Regardless of the implementation specific name applied, the data network gateway 22 is a conventional routing entity that serves as a gateway that allows the wireless network resource group 4 to communicate with the data network resource group 6. The visitor location register 24 or the SGSN has the ability to report the location of the mobile station 8 to the home location register 16. The visitor location register or the SGSN can be programmed to report to the home location register 16 (via the data switching node 20) whenever a mobile terminal enters or leaves their jurisdiction.

The data network resource group 6 of FIG. 1 includes a data network application server 30, a user profile server 32, a localized directory server 34 and may include a wireless network gateway 36. It is to be noted that the WAP is slowly being phased out of the WAP standards. As previously described, the application server 30 also maintains an interface with the home location register 16. This interface is used by the application server 30 to request notification of mobile terminal location changes. The application server 30 similarly maintains interfaces with the user profile server 32. Note that each of these interfaces can be advantageously based on commonly used IETF (Internet Engineering Task Force)/W3C (World Wide Web Consortium) specifications, such as XML (eXtensible Markup Language) over HTTP (Hyper Text Transfer Protocol), etc.

The user profile server 32 is a data network entity that stores user profile information provided by a wireless subscriber. It includes a GUI (Graphical User Interface 50, preferably implemented as one or more WWW web pages) that is programmed to prompt for and receive input regarding the customer service information that is desired by the subscriber. For example, if the subscriber wishes to be informed about services, the user profile information may include service types, serving company names or service chain names, etc. A data storage resource 52 associated with the user profile server 32 stores the user profile information received via the GUI 50. An interface in the user profile server is responsive to user profile information queries from the application server 30 and provides user profile information thereto upon request.

The local directory server 34 is a data network resource which may be operated by the local telephone provider, the participating service providers, or third party directory providers. These providers maintain local directory databases 34. The foregoing entities of the wireless network resource group 4 and the data network resource group 6 are adapted to support a directory service.

Figure 2:
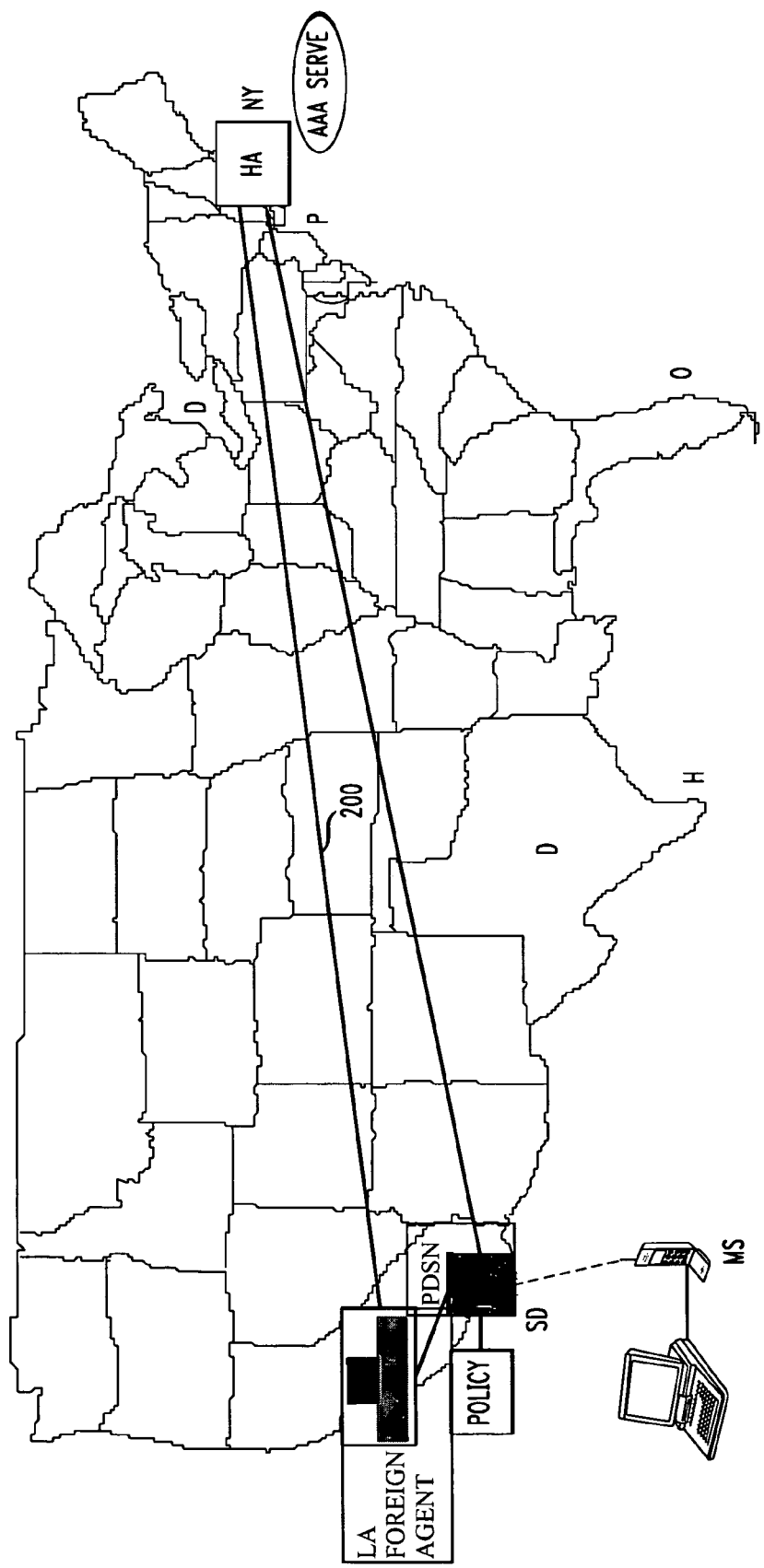
FIG. 2 illustrates tunneling.
Figure 3:
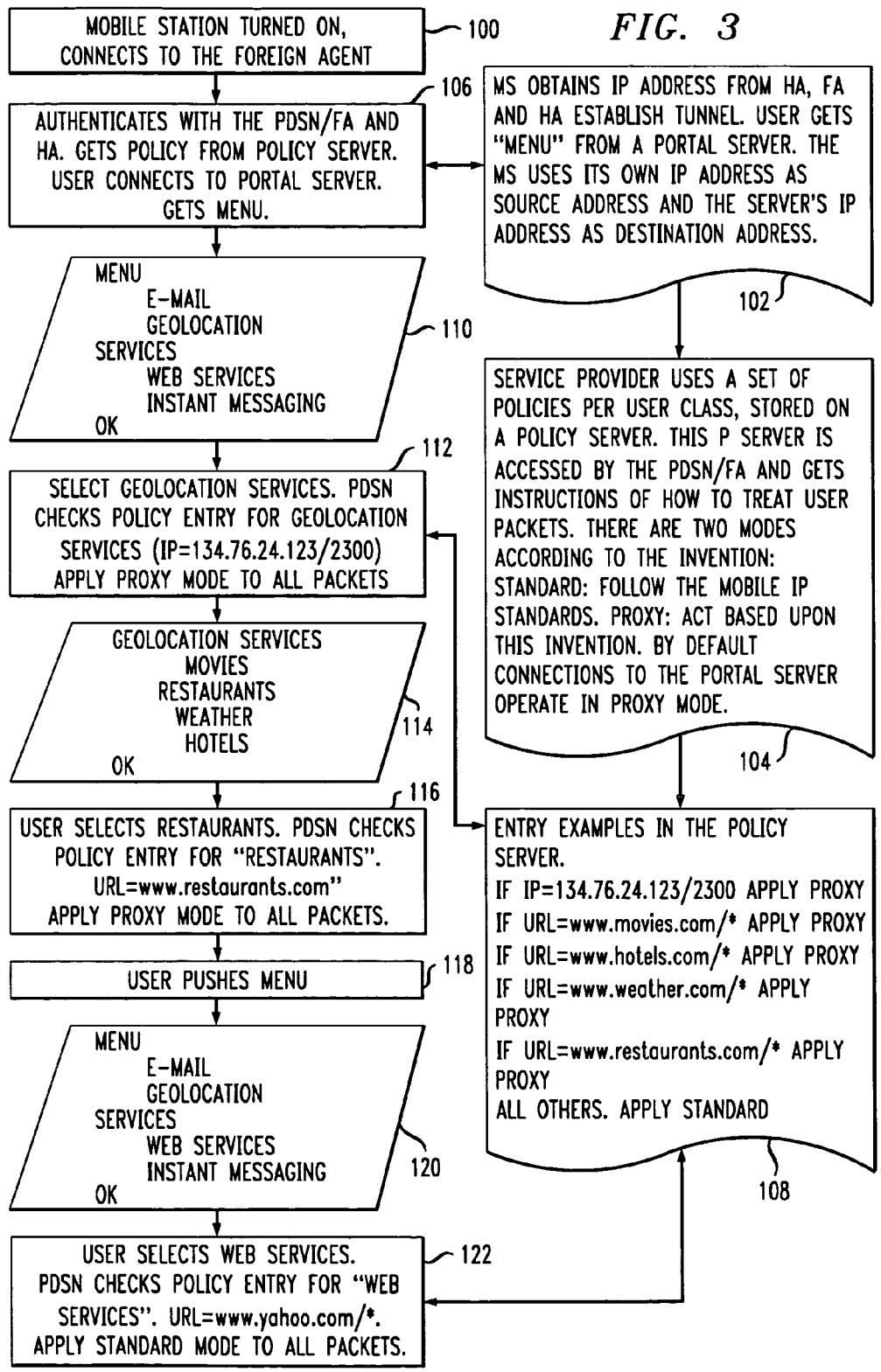
FIG. 3 is a flow diagram of a series of steps which effect a savings in transport costs and a reduction of response time when processing packets in accordance with the principles of the invention.

Referring now to FIGS. 2 and 3, for purposes of illustration, it is assumed that the mobile station is located in California, but is a subscriber to a Home PLMN (14) located in N.Y. (a CDMA Network). To invoke service, the mobile station subscriber activates his/hers mobile station (step 100) and establishes a connection with the Packet Data Service Node/Foreign Agent (PDSN/FA) in the wireless network resource group 4 and the data network resource group 6, both of which may be located in California and which are adapted to support an on location directory service. At this instant two sequences occur here referenced as step 102 and step 110. In step 102, the mobile station obtains an IP address from the Home Agent (HA). The Home PLMIN 14 which is the Home Agent and the Foreign Agent (the visited PLMN) establish a tunnel 200 (see FIG. 2) between N.Y. and Calif. Continuing with step 102, a portal server near the Foreign Agent sends a menu to the mobile station. The menu can include, as noted above, a list of available services like restaurants in addition to other information such as hotels, movies, Internet access, etc. The mobile station uses its own IP address as the Source Address and the Servers IP address as the Destination Address. The PDSN can access a Policy server to determine how to handle user's packets. In step 104, there is a set of possible policies for each class of users which is accessed by the PDSN/FA for instructions on how to treat a user's packets. In accordance with the principles of this invention, the user packets can be treated in one of two ways. One treatment is that which follows the Mobile IP Standards. The other treatment is the proxy (default) mode. Referring to step 108 the Policy server can be set, for example, to apply the proxy (default) setting is IP=134.76.24.123/2300.

The proxy setting is also applied for the following address:
   URL=www.movies.com
   URL=www.hotels.com
   URL=www.weather.com
   URL=www.restaurants.com For all other addresses, the standard setting is used.

Thus, in those instances when the above noted addresses are used, the PDSN/FA sends out the packets with its own IP address and routes the response packets to the MS without the intervention of the HA. The packets are not sent to the PDSN/HA located in N.Y. and then tunneled back to California.

In step 106, the mobile station, when it is turned on, authenticates with the PDSN/FA and the PDSN/HA. The policy is obtained from the Policy server to identify packets which are processed in accordance with the Standards and are transmitted along the tunnel from the Home Agent, and those that are processed according to this invention and, therefore, are not transmitted along the tunnel from N.Y. The mobile station is connected to the server at the FA or portal and receives the menu which, in this instance, will include "restaurants". Referring to step 110, the menu can designate various services available to the subscriber such as E-mail; Geolocation and/or Services such as WEB services, instant messaging etc.

In the description of this invention, it is assumed that the user is interested in selecting a restaurant. Therefore, in step 112 the user selects Geolocation services. The PDSN checks the Policy entry for Geolocation Services (defined in 106) which would be IP=134.76.24.123/2300 which applies the Proxy Mode of operation to all packets. Thereafter, in step 114, the various Geolocation Services subscribed to by the user are displayed. In this example, they can be Movies, Restaurants, Weather, and Hotels etc.

The user selects Restaurants (step 116). The PDSN checks the Policy server for restaurants where the URL is www.restaurants.com. As noted in step 106, this address applies the Proxy mode to all packets. If the user elects to obtain additional services, he/she can go back to Menu, step 118 and the heading Menu, with sub listings of E-mail, Geolocation; and heading of Services with subheading of WEB Services and Instant messaging will again appear (step 120).

In step 122, the user selects WEB Services with default homepage at Yahoo. The PDSN checks the Policy Server for "WEB Services", finds URL=www.Yahoo.com which is not an indicator for the proxy mode as noted in step 106 and, therefore, the Standard mode, (not the proxy mode) is applied to all packets.

In this invention there is disclosed a new and improved method of operating the 20 PDSN/FA's while still following the IS 835, RFC 2002 standards. As with the Standards, each user is authenticated via the Home Agent and service authorization is obtained from the Home Agent. The transmission route of packets of a specific session is determined by a predetermined policy. In one instance the transmission route defined for the packets of a session will be as described in the Standards where packets from a mobile station that is connected to a Foreign Agent are routed to their destinations and responses are sent to the Home Agent first and then tunneled to the PDSN/Foreign Agent. In another instance the transmission route defined for the packets of a session will be as described herein and will not be as defined in the Standards. In this instance, the PDSN assumes a proxy role where it receives the response directly without any intervention on the part of the Home Agent.

More specifically, if the policy that is established is that every connection to the Universal Resource Locator having the address of www.restaurants.com is to be treated according to this invention, then the PDSN will assume the role of the proxy for this specific session and it will send all packets that belong to this connection with its own IP address as the source address. Thus, the server at the Foreign Agents Packet Data Service Node will send the response packets to the Packet Data Service Node, and it knows how to forward the received packets to the Mobile Station. Thus, in the example given above where a call is being made from a mobile station located in California, and the service provider for the mobile station is located in N.Y., the packets for that session will not travel all the way to N.Y. and then back to California. Clearly, this results in saving transport cost as well as a saving in response time. All other WEB requests are treated in the Standard way where the response packets travel to N.Y. and then are tunneled back to California.

While the invention has been described with reference to CDMA, it is applicable to any enhanced second generation or third generation mobile telecommunications system.

While an embodiment of the invention has been described, it should be apparent that many variations and alternative embodiments can be implemented in accordance with the invention. It is understood, therefore, that the invention is not to be in any way limited except in accordance with the spirit of the appended claims and their equivalents.

What is claimed is:

1. A method of transmitting a packet received at a Foreign Agent associated with a Packet Data Service Node where the packet has a source IP address of a mobile station that points to a geographically remote Home Agent and a destination IP address comprising the steps of:

caching IP addresses in memory;

comparing the destination IP address of the received packet with the IP addresses in memory, and if no match is found, querying a Policy Server for a match; and forwarding the received packet with the IP address of the Foreign Agent associated with the Packet Data Service Node as the source IP address when the destination address of the received packet matches the IP address in memory or Policy Server.

2. The method of claim 1 further comprising the step of forwarding the received packet with the source IP address of the mobile station when the destination address of the received packet does not match the IP address in memory or Policy Server.

3. The method of claim 1 wherein a tunnel is established between the Foreign Agent associated with the Packet Data Service Node and the Home Agent when the mobile station initiates a call further comprising the step of not forwarding the packet back along the tunnel when the destination address of the received packet matches the IP address in memory or Policy Server.

4. The method of claim 3 further comprising the step of taking down the tunnel when the destination IP address of the received packet matches the IP address in memory.

5. The method of claim 4 wherein the Foreign Agent associated with the Packet Data Service Node takes down the tunnel.

6. A method of transmitting a packet received at a Foreign Agent associated with a Packet Data Service Node where the packet has a source IP address of a mobile station that points to a geographically remote Home Agent and a destination IP address comprising the steps of:

caching in memory Universal Resource Locator (URL) names;

comparing the URL name of the received packet with the URL names in memory, and if no match is found, querying a Policy Server;

forwarding the received packet with the IP address of the Foreign Agent associated with the Packet Data Service Node as the source IP address when the URL name of the received packet matches the URL name in memory or Policy Server.

7. The method of claim 6 further comprising the step of forwarding the received packet with the IP address of the mobile station when the URL name of the received packet does not match the URL name in memory or Policy Server.

8. The method of claim 6 wherein a tunnel is established between the Foreign Agent associated with the Packet Data Service Node and the Home Agent when the mobile station initiates a call further comprising the step of not forwarding the packet back along the tunnel when the URL name of the received packet matches the URL name in memory or Policy Server.

9. The method of claim 8 further comprising the step of taking down the tunnel when the destination URL name of the received packet matches the URL name in memory or Policy Server.

10. The method of claim 9 wherein the Foreign Agent associated with the Packet Data Service Node takes down the tunnel.

11. A method of transmitting a packet in a wireless network, the method comprising:

receiving the packet from a mobile station at a node for routing the received packet to a service provider server;

causing the node to assume a role of a home network for the mobile station;

in response to receiving the packet at the node, receiving one or more response packets at the node from the service provider server without intervention from the home network;

directly forwarding the one or more response packets to a destination server for the mobile station without sending the one or more response packets to the home network; and receiving, at a Foreign Agent associated with a Packet Data Service Node, the packet with a source network layer address of the mobile station that points to a geographically remote Home Agent associated with the home network and a destination network layer address.

12. The method of claim 11, further comprising:
obtaining the source network layer address from the received packet.

13. The method of claim 12, further comprising:
causing the service provider server to send the received packet to the destination server.

14. The method of claim 13, further comprising:
determining whether the destination network layer address of the received packet matches a network layer address in a memory or a Policy Server; and
if so, forwarding the received packet with the network layer address of the Packet Data Service Node as the source network layer address.

15. The method of claim 14, further comprising:
caching network layer addresses in the memory.

16. The method of claim 15, further comprising:
comparing the destination network layer address of the received packet with the network layer addresses in the memory; and
if no match is found for the destination network layer address in the memory, querying the Policy Server for a match.

17. The method of claim 16, further comprising:
in response to the mobile station initiating a call, establishing a tunnel between the Foreign Agent associated with the Packet Data Service Node and the Home Agent.

18. The method of claim 17, further comprising:
if the destination network layer address of the received packet does not match the network layer address in the memory or Policy Server, not forwarding the packet back along the tunnel.

19. The method of claim 17, further comprising:
if the destination network layer address of the received packet matches the network address in the memory, terminating the tunnel.

* * * * *